Aug. 31, 1965

C. R. WILSON 3,203,282

VARIABLE HOLE CIRCLE DRILL HEAD

Filed April 26, 1963

INVENTOR.
CHARLES R. WILSON
BY
ATTORNEYS

Aug. 31, 1965  C. R. WILSON  3,203,282
VARIABLE HOLE CIRCLE DRILL HEAD
Filed April 26, 1963  2 Sheets-Sheet 2
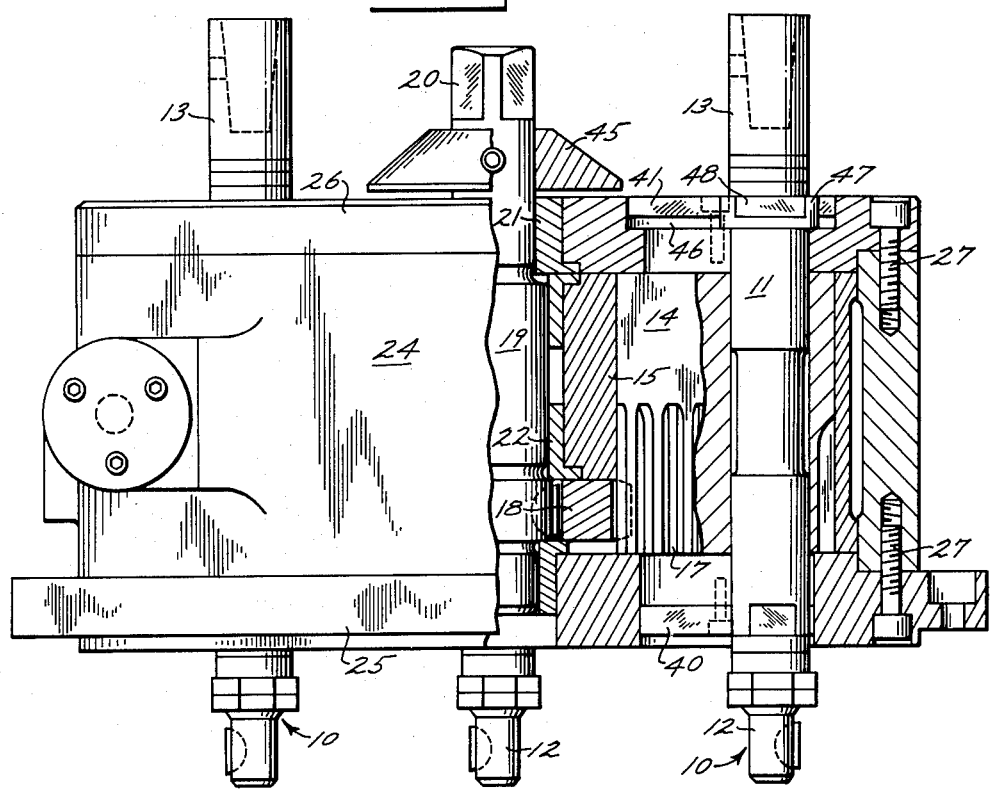
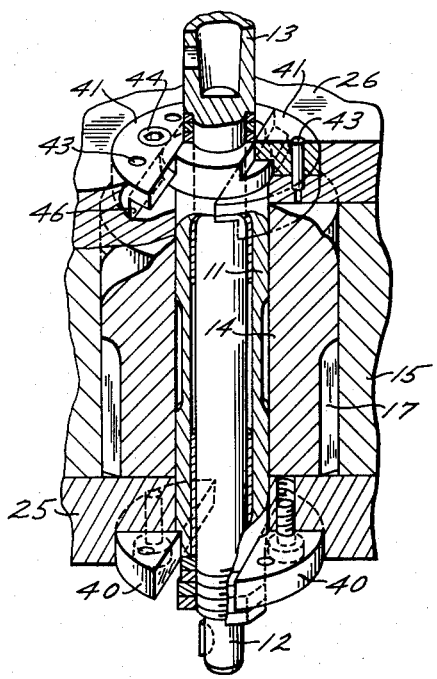
INVENTOR.
CHARLES R. WILSON
BY
ATTORNEYS United States Patent Office 3,203,282
Patented Aug. 31, 1965

3,203,282
VARIABLE HOLE CIRCLE DRILL HEAD
Charles R. Wilson, Pekin, Ill., assignor to Caterpillar
Tractor Co., Peoria, Ill., a corporation of California
Filed Apr. 26, 1963, Ser. No. 275,960
6 Claims. (Cl. 77—23)

This invention relates to multiple drill heads of the kind employed for drilling or tapping a plurality of holes simultaneously in a circular pattern and particularly such a head having means to vary the diameter of the pattern circle.

Commonly known multiple drilling machines employ a drill head which carries a plurality of rotatable drill spindles. One end of each spindle is adapted for connection to a power shaft of the machine usually made adjustable by the use of universal joints or the like. The opposite ends of the spindles carry adapters for drills, taps or other tools and all spindles are driven at once to work at several locations on a work piece simultaneously.

It is the object of the present invention to provide a multiple drill head with drill spindles arranged in a circular pattern and with means to effect simultaneous radial movement of all of the spindles to adjust the size of the pattern for adapting the heads to work pieces of different sizes and to provide means for releasably securing the spindles against such adjustment while the head is in use.

Further and more specific objects and advantages of the invention are made apparent in the following specification wherein it is described in detail by reference to the accompanying drawings.

In the drawings:

FIG. 2 is a view in elevation looking upwardly at the lower side of FIG. 1 and having parts broken away and parts in section; and FIG. 3 is a fragmentary view in perspective and partially in section illustrating the mounting and adjusting means for one of the spindles shown in FIGS. 1 and 2.

Figure 1:
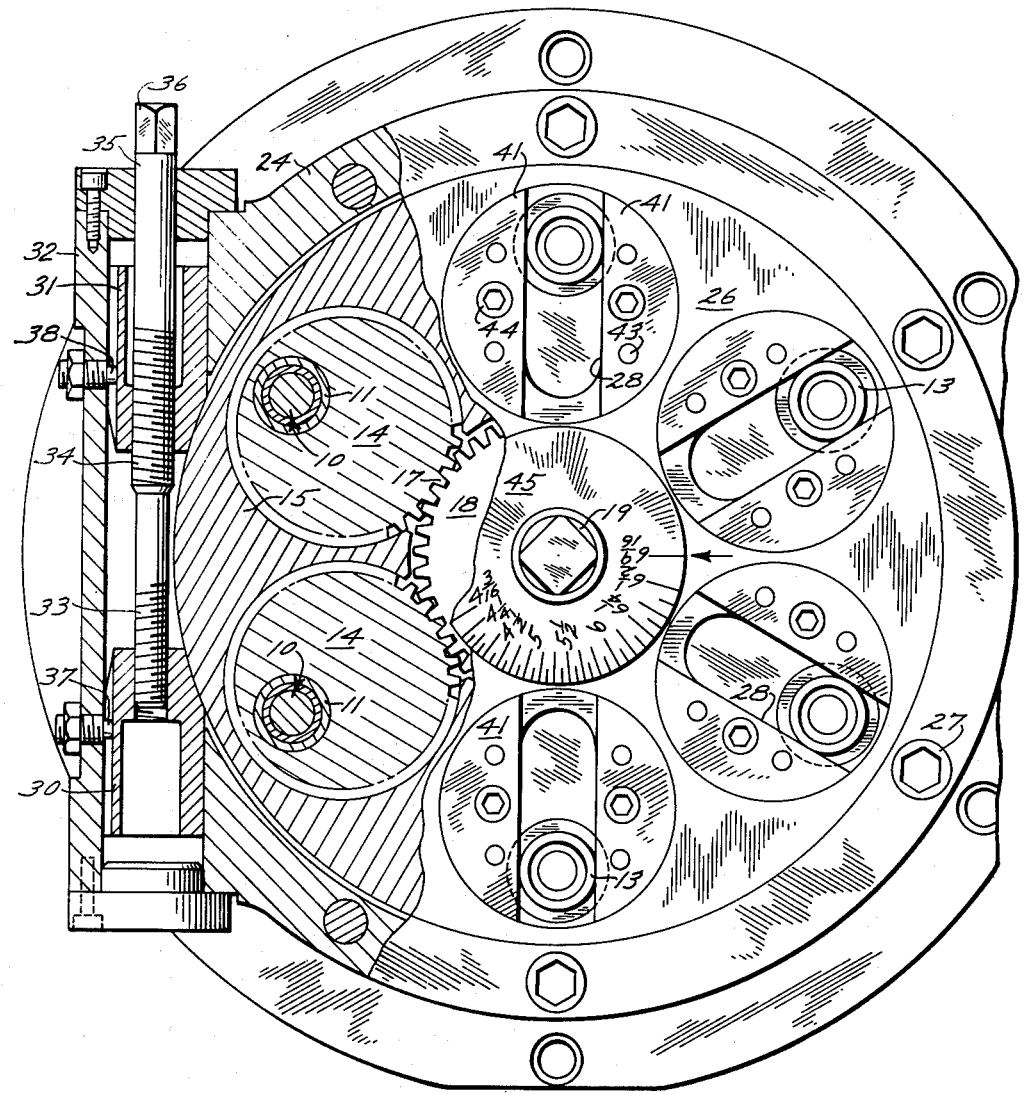
FIG. 1 is a view in front elevation of a drill head embodying the present invention with a portion of the view illustrated in section.

The drill head of the present invention is shown in FIGS. 1 and 2 as having fixed spindles, generally indicated at 10, arranged in a circular pattern in spindle carriers 11 in which they are conventionally mounted for rotation with suitable bushings and thrust bearings. The spindles are also conventionally provided with drive ends 12 adapted for connection with the drive means of a multi-drill press and work ends 13 for reception of a drill or other tool adapter.

Each spindle and carrier is mounted in a cylindrical rotatable adjuster 14, best shown in FIGS. 2 and 3, and the adjusters are disposed in equally spaced cylindrical pockets in a block 15. The spindles are eccentrically disposed in the cylindrical adjusters so that rotation of the adjuster with respect to the body will vary the distance between the spindles and the center of the drill head and rotating all of the adjusters will vary the size of the hole circle to be drilled. To effect simultaneous and equal adjustment of the drill spindles, the adjusters 14 are provided with gear teeth 17 adjacent one end, all meshing with the teeth of a common centrally disposed control gear 18 keyed or otherwise secured for rotation with a control shaft 19 having an exteriorly disposed squared end 20 for reception of a tool to impart rotation thereto. Suitable bushings such as shown at 21 and 22 in FIG. 2 support the control shaft 19 for rotation with respect to the body 15. Rotary adjustment of the control shaft and gear therefore imparts rotation to all of the spindle adjusters for varying the circle pattern of the drill head. The block 15 is of cylindrical contour and is mounted in a case 24 having a cover 25 at the drive end and a cover 26 at the work end, both secured in place as by cap screws shown at 27 in FIG. 2.

Since it is desirable that the drill heads be adjusted radially on straight lines, rather than upon arcs about the centers of the adjusters 14 in which they are carried, they are guided for rectilinear movement ins lots 28, best shown in FIG. 1, in the cover plate 26. Consequently when the control gear is rotated to rotate the adjusters 14, for example in a clockwise direction, the tendency of the spindle carriers to move clockwise will rotate the block 15 in a counterclockwise direction within its housing as the spindles move radially of the head. The spindles are locked in a desired position of adjustment by locking nuts shown in FIG. 1 at 30 and 31 slidable in the casing 32 formed as a part of the housing 24. The nuts 30 and 31 have right and left hand threaded connections 33 and 34, respectively, with a locking post 35 which extends through the housing 32 and has a projecting squared end 36 to facilitate rotation thereof. The nuts may be splined and held against rotation as by keys 37 and 38 which extend into the housing. The inner ends of the nuts are shaped to conform to the cylindrical outer wall of the block 15 so that when drawn together a wedging force is created to prevent rotation of the block and to hold the spindles in their positions of adjustment. The slots 28 in the cover 26 and similar slots in the cover 25 are formed by hardened inserts, best shown in FIG. 2 at 40 and 41 for the drive and work ends of the spindles respectively. The inserts 41 have undercut edges as shown at 46 in FIG. 3 and annular thrust shoulders 47 (see FIG. 2) on spindle carriers 11 are formed with flats 48 to provide complementing shoulders. Locating pins 43 and cap screws 44 retain the inserts in place.

The control shaft 19 may be provided with an index plate 45 (see FIG. 1) bearing calibrations to indicate the diameter of the hole circle setting and adjustment is made by first releasing the wedging nuts 30 and 31, then turning the control shaft to the desired setting. The drills or other tools in use are then inserted into holes in a jig or template to insure accuracy before the nuts 30 and 31 are tightened against the block 15.

I claim:

1. A variable hole circle drill head comprising a housing, a block in the housing, a plurality of cylindrical members rotatable in the block and having peripherally disposed gear teeth, a drill spindle carried eccentrically of each cylindrical member, the axes of said cylindrical members being disposed in a circular pattern, a centrally disposed rotatable control member, and a gear on said control member meshing with the gear teeth on all of said cylindrical members whereby rotation of the control member will effect radial adjustment of all drill spindles simultaneously.

2. The combination of claim 1 in which the control member has a part extending to the exterior of the housing with indicia thereon for indicating the diameter to which the hole circle has been adjusted.

3. The combination of claim 1 in which the block is rotatable in the housing and the drill spindles are confined to rectilinear movement radially of the block whereby adjustment will cause the block to rotate in the housing.

4. The combination of claim 3 in which the housing has covers at opposite ends and the means to confine the spindles comprises members secured to said covers and having straight edges guiding said spindles.

5. The combination of claim 3 with means to lock the block against rotation.

6. The combination of claim 5 in which the locking means includes two members engageable with the periphery of the block, and means threadedly engaging said members to draw them toward each other and into tight engagement with the block.

No references cited.

WILLIAM W. DYER, Jr., *Primary Examiner.*

UNITED STATES PATENT OFFICE
CERTIFICATE OF CORRECTION

Patent No. 3,203,282                                August 31, 1965

Charles R. Wilson

It is hereby certified that error appears in the above numbered patent requiring correction and that the said Letters Patent should read as corrected below.

Column 2, line 62, the claim numbered "2" should appear as claim number -- 6 --; line 66, the claim numbered "3" should appear as claim number -- 2 --; column 3, line 4, the claim numbered "4" should appear as claim number -- 5 --; same line for the claim reference numeral "3" read -- 2 --; line 8, the claim numbered "5" should appear as claim number -- 3 --; same line 8, for the claim reference numeral "3" read -- 2 --; column 4, line 1, the claim numbered "6" should appear as claim number --4 --; same line 1, for the claim reference numeral "4" read -- 3 --.

Signed and sealed this 5th day of April 1966.

(SEAL)
Attest:

ERNEST W. SWIDER                               EDWARD J. BRENNER
Attesting Officer                               Commissioner of Patents